United States Patent
Kuhnel et al.

(10) Patent No.: US 6,240,078 B1
(45) Date of Patent: May 29, 2001

(54) ATM SWITCHING ARCHITECTURE FOR A WIRELESS TELECOMMUNICATIONS NETWORK

(75) Inventors: Thomas Kuhnel, Bern; Christopher Varlese, Niederwangen, both of (CH)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/133,843

(22) Filed: Aug. 13, 1998

(30) Foreign Application Priority Data

Aug. 20, 1997 (EP) .................................................. 97810584

(51) Int. Cl.[7] .................................................. H04L 12/56
(52) U.S. Cl. ............................................ 370/331; 370/397
(58) Field of Search ..................................... 370/331, 328, 370/397, 398, 395, 338, 332, 333, 329

(56) References Cited

U.S. PATENT DOCUMENTS

| 5,787,077 | * | 7/1998 | Kuehnel | 370/331 |
| 5,875,185 | * | 2/1999 | Wang et al. | 370/331 |
| 5,889,769 | * | 3/1999 | Mizuno | 370/328 |
| 6,023,461 | * | 2/2000 | Raychaudhuri et al. | 370/331 |

FOREIGN PATENT DOCUMENTS

| 0679042A2 | 10/1995 | (EP) . |
| 0749261A2 | 12/1996 | (EP) . |
| WO 94/28645A1 | 12/1994 | (WO) . |
| WO 97/29605A1 | 8/1997 | (WO) . |

\* cited by examiner

Primary Examiner—Douglas Olms
Assistant Examiner—Ken Vanderpuye

(57) ABSTRACT

An ATM switching architecture for a wireless telecommunications network includes two separate units having different functionality. The first unit performs mobility control, wherein a virtual path which contains all virtual channels of a mobile terminal is switched from a first port associated with a first access point, to a second port connected to a first port of the second unit. The second unit performs a switching operation, wherein the virtual channels of the mobile terminal are distributed from the first port of the second unit to different destination ports of the second unit. In one embodiment, the two units may be dedicated hardware components, and in another embodiment, one single hardware component is functionally separated into two separate units connected by a loopback link.

12 Claims, 5 Drawing Sheets

ATM SWITCHING ARCHITECTURE FOR A WIRELESS TELECOMMUNICATIONS NETWORK

TECHNICAL FIELD

The invention relates to an ATM switching architecture for a wireless telecommunications network, comprising a plurality of ports for a plurality of access points of a wireless cellular communication system and means for performing switching operations and mobility control.

PRIOR ART

In order to provide mobile communication services, modern telecommunications networks include switching stations (switching centers) each handling a plurality of access points (base stations) for establishing radio links to mobile terminals. One single switching station not only establishes the connection between the mobile terminal and any requested other terminal in the network, but it also deals with the mobility control for the mobile terminal. This control manages the handover if the radio link deteriorates during the ongoing connection and if a new radio link has to be established. The new radio link may be established to the access point of a neighbouring cell or to that one in the same cell.

There is a recent need for a flexible and powerful data transfer over the telecommunications network. This need may be met by ATM (Asynchronous Transfer Mode). ATM is based on the concept of virtual paths (VP) and virtual channels (VC). An ATM-architecture is known e.g. from U.S. Pat. No. 5,633, 868.

U.S. Pat. No. 5,633,868 discloses several methods for performing so-called hand-offs (which is a process of changing the route of information flow to and/or from the wireless terminal to a fixed point e.g. a radio port). There are hard and soft hand-offs (both fast and slow). A hard hand-off sets up a new route and almost concurrently tears down the old route; it is used by wireless access technologies that do not use diverse air routes. A soft hand-off, on the other hand, is employed by systems with diverse air routes. The fast hand-off is accomplished by either completely or partly pre-establishing the VP/VCs between a given Packet Handler and all of its associated radio ports and by only activating those resources that are actually needed at a given time. However, if there is no pre-established VP/VC, the hand-off is slow.

ATM operates connection oriented, i.e. a connection is established before ATM cells are transmitted. Establishing and releasing connections is done via signalling operation (via signalling channels). In an ATM-system, there is one or a plurality of VCs emanating simultaneously from one terminal. In the ATM switch, these VCs enter through a single port of the switch, but may end at different destination ports in the switch. This does not put any problems in a fixed network which does not require the switching of the VCs from one port to another port during an on-going connection. However, a cellular communications network has to deal with handovers and therefore with switching between several physical ports. The switching operation has to take place as quickly as possible in order to minimize the loss of data (or to minimize the buffer capacity required for a so called lossless or seamless handover).

SUMMARY OF THE INVENTION

It is an object of the present invention to provide a switching architecture in a telecommunications network, wherein the hardware is able to make quick handovers for ATM connections.

The object is achieved by the features defined in claim 1. According to the invention, the means for performing switching operations and mobility control is separated into two units with different functionality. The first unit is performing the mobility related switching (mobility control), wherein a virtual path which contains all virtual channels of a mobile terminal is switched from one port that is associated with an access point to a port that is connected to the second unit. The second unit is performing the call related switching operation (e.g. switching of permanent VCs, switching of signaled VCs), wherein the virtual channels of the input port are distributed to different destination (or target) ports in the unit.

If a handover is required, it is only necessary that the first unit performs a redirection of all VCs to an alternate port. All VCs can be handled as if they were in one "pipe", so that said "pipe" can be directed as a whole to a new port. The switching unit that handles the VP/VC connections has nothing to do with the handover, it can work as if there was no handover at all. That means that it may deal in a conventional manner with setting up the connection and with allocating the VCs (e.g. user channel, signalling channel) to the different ports.

The proposed solution has the following advantages:

The ATM switch does not have to switch each of the VCs individually (which may each join to different ports or which may terminate in the switch, as is the case for the signalling channel).

It is not necessary to have a switch architecture that is able to perform seamless switching of connections. Nevertheless, the handover does not require the implementation of shifting VP cross-connections.

The problem of having to do a CAC (connection admission control) recalculation for each individual VC (in order to assure that the new port has sufficient bandwidth to accept the VCs) can be avoided.

The two units may be realized within the same hardware but in separate functional units (a hybrid VP/VC switch). The control program defines whether the unit is for mobility control or for VC switching. This minimizes the costs of the hardware. It is not necessary to develop and to produce different components. The two units of the hardware component are connected in series by means of a fixed (external or internal) loopback link. One particular port of the mobility control unit is therefore connected with one particular port of the connection related switching unit.

There may be two physically separate dedicated hardware components. It is an advantage of the present ATM switch architecture that it can be used to modify (i.e. extend the operation of) existing ATM switches by simply inserting a front-end module between the access points (that serve for wireless communication links) and the conventional ATM-switch.

The intra-switch handover is very simple. If the existing radio link between the access point and the mobile terminal undergoes degradation or breaks down, the mobility control unit selects the new access point (which may be determined either by the mobile terminal or by the mobility control) and reassigns the Virtual Path Identifier (VPI) to the corresponding new port. All VCs are therefore shifted to the new port by one operation.

The VP/VC connection related switching unit may be of a conventional type. As it is known in the art, an ATM switch contains a signalling unit that is connected to the mobile terminal by a virtual channel for VP/VC connection related signalling (e.g. SETUP, CONNECT, RELEASE; see e.g. The ATM Forum: ATM USER-NETWORK INTERFACE SPECIFICATION Version 3.1, Prentice Hall, 1995). This means that there are at least two VCs that terminate at different destination entities in the ATM switch. In many cases, there will even be a plurality of user VCs that branch off to different destinations.

According to a preferred embodiment, a handover buffer is placed (inserted) in the fixed link between the two functional units. The buffer may be a FIFO unit that always contains copies of a certain number of preceding ATM-cells. If cells get lost in the radio channel because of a handover, they may be transmitted again by simply recalling the buffered cells and transmitting them via the newly established radio link.

Further details of the invention as well as different combinations of preferred features will become evident on the basis of the following description.

BRIEF DESCRIPTION OF THE DRAWINGS

The present invention will become more fully understood from the detailed description given hereinbelow and the accompanying drawings which are given by way of illustration only, and thus are not limitative of the present invention. The drawings show.

Same elements are indicated by identical reference numerals.

PREFERRED EMBODIMENT

A switch that is able to handle wireless operation is a key factor for the widespread implementation of a wireless ATM network. Beside processing normal call related operations (Signalling, Call Admission Control=CAC, Routing) which are also common for ATM switches employed in a fixed ATM network, mobility enhancements for proper operation in a wireless network are needed. These enhancements are related to registration, handover, and de-registration. Registration means a mobile terminal associates with an access point and registers with the switch and the network. Handover occurs if a mobile terminal moves from one radio cell to another radio cell that is serviced by another access point. The mobile terminal is de-registered if it leaves the coverage of the radio cells or is simply switched off.

Figure 1:
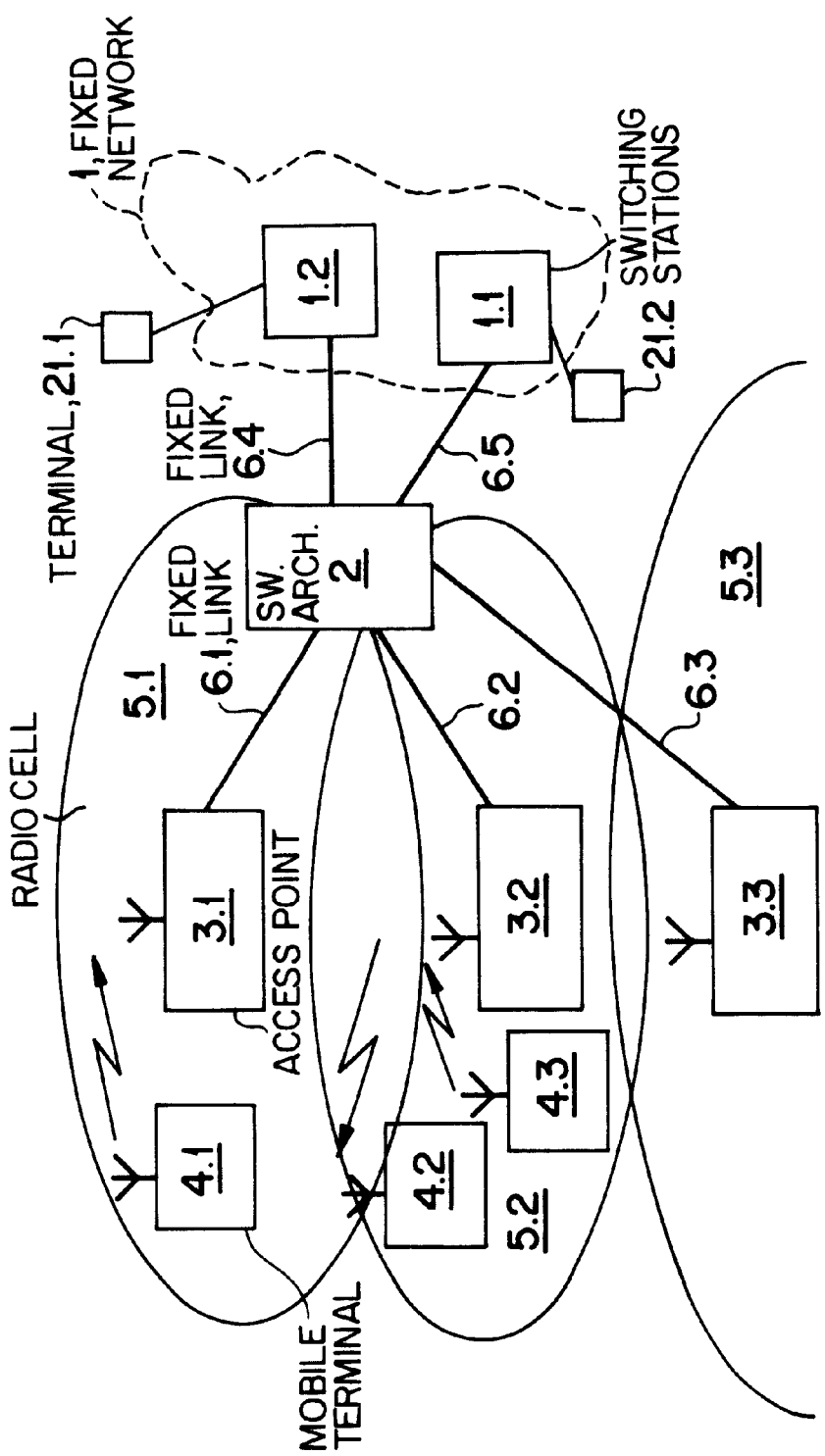
FIG. 1 a diagrammatic representation of a wireless network.

FIG. 1 shows a typical configuration for supporting mobile ATM based telecommunication. Reference numeral 1 indicates a so called fixed network. That means that the terminals 21.1, 21.2 are stationary and therefore connected by fixed links (e.g. electrical or optical cables) to the network 1.

There is a switching architecture 2 which is connected by one or more fixed links 6.4, 6.5 to switching stations 1.1, 1.2 of the network 1. Switching architecture 2 handles a number of access points 3.1, 3.2, 3.3 for providing wireless communication through wireless links 9.1 and 9.2 with mobile terminals 4.1, 4.2, 4.3. The access points 3.1, 3.2, 3.3 (base stations) are connected by fixed links 6.1, 6.2, 6.3 to the switching architecture 2. Each radio cell 5.1, 5.2, 5.3 is covered by at least one access point 3.1, 3.2, 3.3.

The switching architecture 2 performs the switching operations that are necessary to connect a mobile terminal 4.1, 4.2, 4.3 with any other mobile terminal (e.g. 4.2, 4.3, 4.1) or stationary terminal (e.g. 21.1, 21.2) in the network. Point-to-multipoint connections between one source and multiple receiver stations are also possible. Beneath the VCs for providing user connections to other terminals, there is at least one signalling VC for the coordination and control of the telecommunication links. A VP can contain a plurality of VCs. The concept of VP/VC connections is well known in the art of ATM (e.g. William Stallings "Data and computer communications", 4th Edition, McMillan Publishing Company, Englewood Cliffs, 1994, pp. 799–831).

There are multiple ways of implementing mobility control. One preferred implementation will be described briefly. The access point performs the mapping between the VP and the radio channel that is used. The mapping can be done automatically or it can be triggered by the mobility controller. Upon association, a dedicated radio channel is assigned for the radio link between the access point and the mobile terminal. Some initial data (such as identifications of the terminal and the access point) are exchanged using the newly established radio link between the access point and the mobile terminal. The access point informs the mobility controller of the identification of the mobile terminal. The VP (to which the radio channel is mapped) may be automatically assigned or selected by the mobility controller. The identification of the mobile terminal and the associated VP are stored in the database of the mobility controller.

De-registration results in the notification of the lost radio connection between the access point and the mobile terminal to the mobility controller. After a given delay (T), the mobility controller releases allocated resources and clears the registration of the mobile terminal, i.e. the database entry of the identification of the mobile terminal is removed.

A handover can be interpreted as a combination of de-registration and subsequent registration, where the de-registration has not been completed. The mobility controller is informed of the lost radio connection (de-registration phase) and, subsequently, an association with another (it could also be the same) access point is established (registration phase). The time interval between de-registration and registration should be less than a predetermined delay T. Otherwise the identification entry of the mobile terminal is removed from the internal database.

Due to the matching mobile terminal identifiers the associated VPs (the VP used on the initial access point and the access point the mobile terminal newly associated with) could be identified (matched). Subsequently, the mobility controller releases the old VP cross-connection (between the port of the old access point and the target port) and creates a new VP cross-connection (between the port of the new access point and the target port).

The registration and de-registration of the mobile terminal with the network and the switching architecture can also be implemented on the basis of standard procedures like ILMI (The ATM Forum: ATM USER-NETWORK INTERFACE SPECIFICATION Version 3.1, Prentice Hall, 1995).

Figure 2:
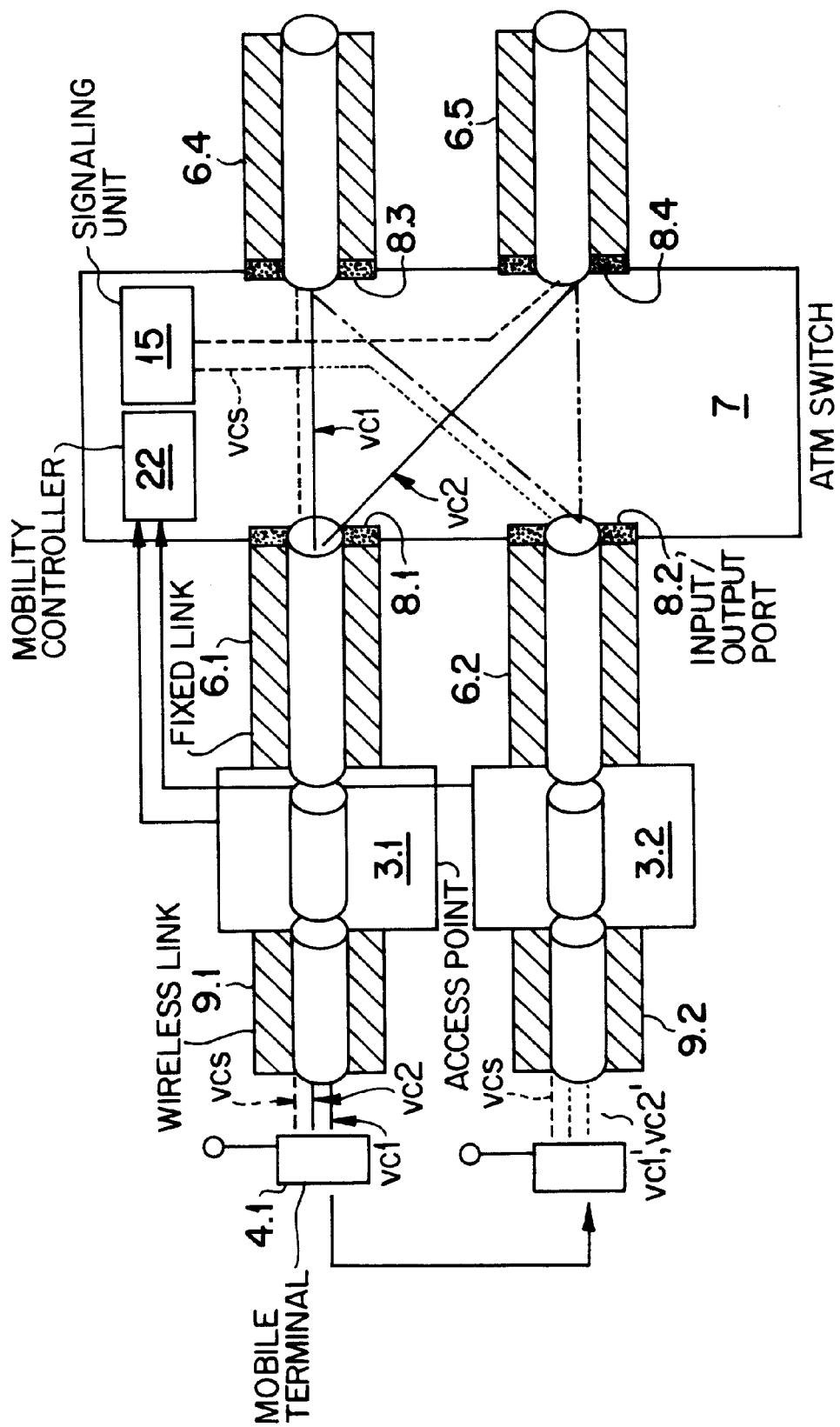
FIG. 2 a diagrammatic representation of a conventional ATM-switch.

FIG. 2 schematically illustrates a conventional ATM-switch 7. According to the simplified present example, there are indicated four input/output ports 8.1, 8.2, 8.3, 8.4. Ports 8.1, 8.2 are connected via fixed links 6.1, 6.2 (e.g. electric or optical cable) to the access points 3.1, 3.2 and ports 8.3, 8.4 are connected via fixed links 6.4, 6.5 to the ATM switches 1.1, 1.2 of the fixed network 1.

The mobility controller 22 supervises the handover when the mobile terminal moves from one access points to another one in the wireless communications network.

FIG. 2 shows that there are two (or more) VCs vc1, vc2, vcs, departing from one mobile terminal 4.1. They all enter through one port 8.1, but they do not all end at one destination port. In fact, at least one VC vcs terminates at the signalling unit 15 of the ATM-switch 7 and not at an input/output port. In addition, there may be VCs vc1, vc2 to different target ports 8.3, 8.4. The VP that is associated with the mobile terminal 4.1 terminates in the ATM switch 7.

If the mobile terminal 4.1 moves out of the present radio cell (which is covered by access point 3.1) into another cell (which is covered e.g. by access point 3.2), all pending connections have to be handed over from port 8.1 to port 8.2 inside the switch 7. According to the prior art, this operation of shifting connections has to be done on a VC basis, i.e. for each VC individually, which results in a high control overhead. Furthermore, this known operation is time-consuming.

According to the invention, all VCs relating to one particular mobile terminal can be shifted in one step and therefore very quickly. In addition, this step can be implemented without developing new and more complex integrated circuits. This will be explained with reference to FIGS. 3 and 4.

Figure 3:
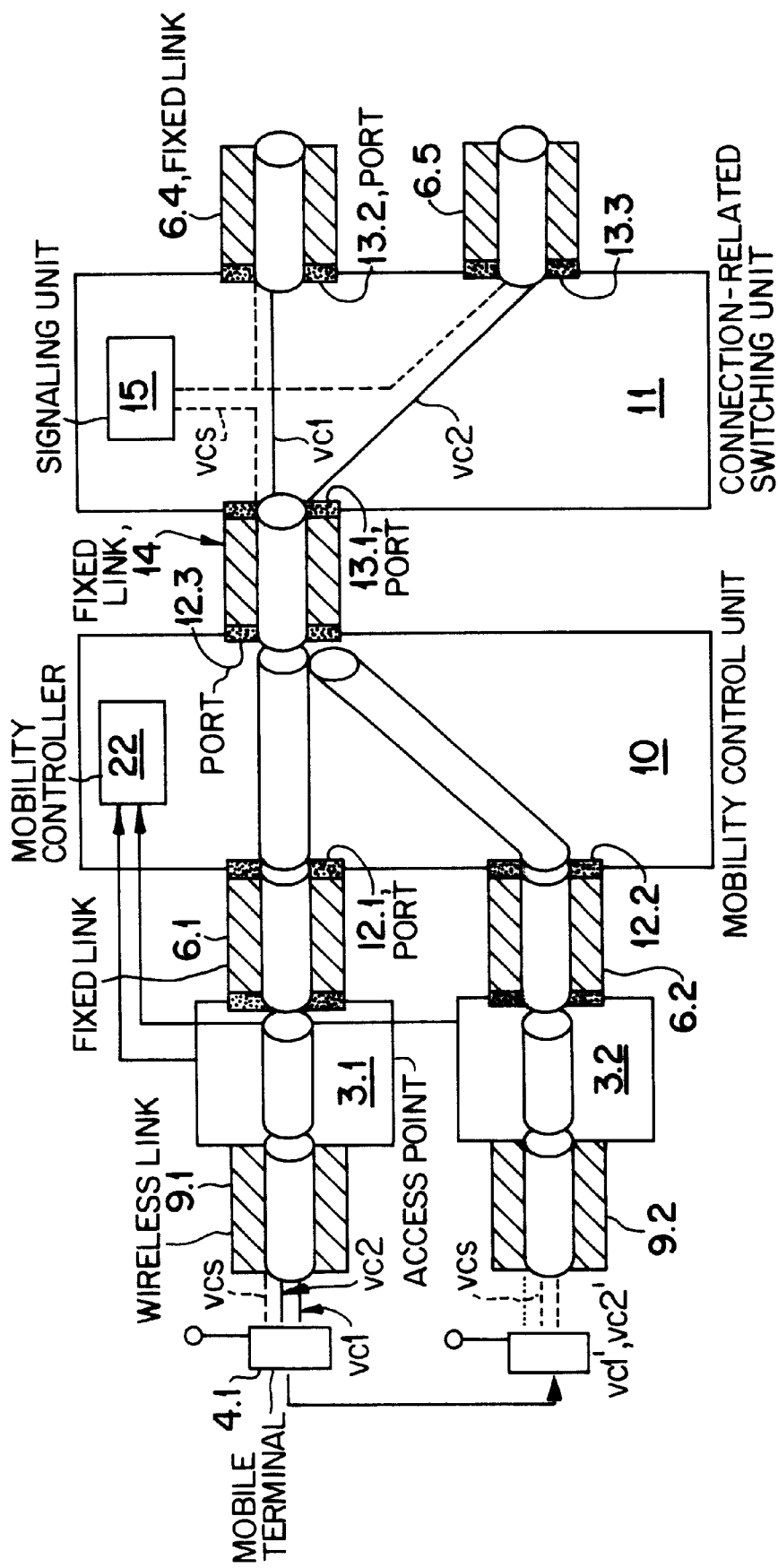
FIG. 3 a diagrammatic representation of a first embodiment using separate circuits for mobility control and for switching operations.

FIG. 3 illustrates the first of the two preferred embodiments. The ATM-switch 7 of FIG. 2 is replaced by two separate units 10, 11. The first one is the mobility control unit 10. In the simplified representation of FIG. 3, the mobility control unit 10 has two ports 12.1, 12.2 connected to the access points 3.1, 3.2 and one port 12.3 connected to the second unit 11. Unit 10 contains the mobility controller 22, which is in constant contact with the access points 3.1, 3.2.

The mobility control unit 10 is followed by the connection related switching unit 11, the two units being connected by at least one fixed link 14 (e.g. a short lead). Therefore, port 12.3 of unit 10 is directly connected to port 13.1 of unit 11. Ports 13.2 and 13.3 of unit 11 are connected via the fixed links 6.4, 6.5 to the fixed telecommunications network 1 (see FIG. 1).

All VCs vc1, vc2, vcs, that are associated with mobile terminal 4.1 enter through port 12.1 and are directed in one VP ("pipe") to the port 12.3. There is no branching off of any signaling or other channel. The signaling unit 15 for controlling the user communication is implemented in unit 11. The VC vcs for signaling therefore branches off in the unit 11 (at port 13.1). Further VCs may branch off to different input/output ports of unit 11 (in the same way as in the conventional ATM switch 7 shown in FIG. 2).

This first embodiment which uses a separate VP switch for mobility operation works as follows:

After association of the mobile terminal 4.1 with the access point 3.1 a VP from unit 11 via unit 10 and the access point 3.1 to the mobile terminal 4.1 is created. At the air interface, the VP is mapped into one or several radio channels. One or multiple signaling VCs between the mobile terminal 4.1 and the signaling unit 15 of unit 11 are automatically configured. Other steps like authentication of the mobile terminal, address registration, verification can take place by using these established signaling VCs. De-registration results in the reverse steps of registration.

According to the invention, the mobility control unit 10 is not involved in the handling of the data transmitted in the signaling channel. All VCs pass the first unit 10 in one VP.

Connection setup results in the creation of a VC between the mobile terminal 4.1 and the switching unit 11. The VC is inside the VP that is associated with the mobile terminal 4.1. Each VC is switched to the designated port of unit 11. The appropriate port is determined in a well-known way on the basis of the routing function of the signaling unit 15. Connection setup can be done multiple times resulting in multiple VCs. The VCs can be switched between various ports and VPs of switching unit 11 including those which are associated with other mobile terminals. Point-to-multipoint connections (which can be used for broadcasting messages) are supported within unit 11, where the cell-multicasting takes place. Switching unit 11 performs normal CAC operation for each connection setup attempt. Releasing a connection is done by carrying out the reverse of the above mentioned steps.

A handover is done in the following way:

After the mobile terminal 4.1 has moved out of radio cell 5.1 to another cell (e.g. 5.2), the mobile terminal 4.1 gets associated with another access point (e.g. 3.2). The VP that is associated with the mobile terminal 4.1 needs now to be switched to another port of the mobility control unit 10. According to the invention, the VP cross-connection in the mobility control unit 10 is redirected in one step to the port 12.2 that is connected to the new access point 3.2. This switching is done on a VP basis, i.e. all VCs inside the VP are simultaneously switched to the new port. The old VP connection via port 12.1 is released. The necessary resource control (CAC) is done once for the entire VP. The handover can be done between any port that is connected to an access point. The individual VC connections in switching unit 11 are not affected by the handover.

Figure 4:
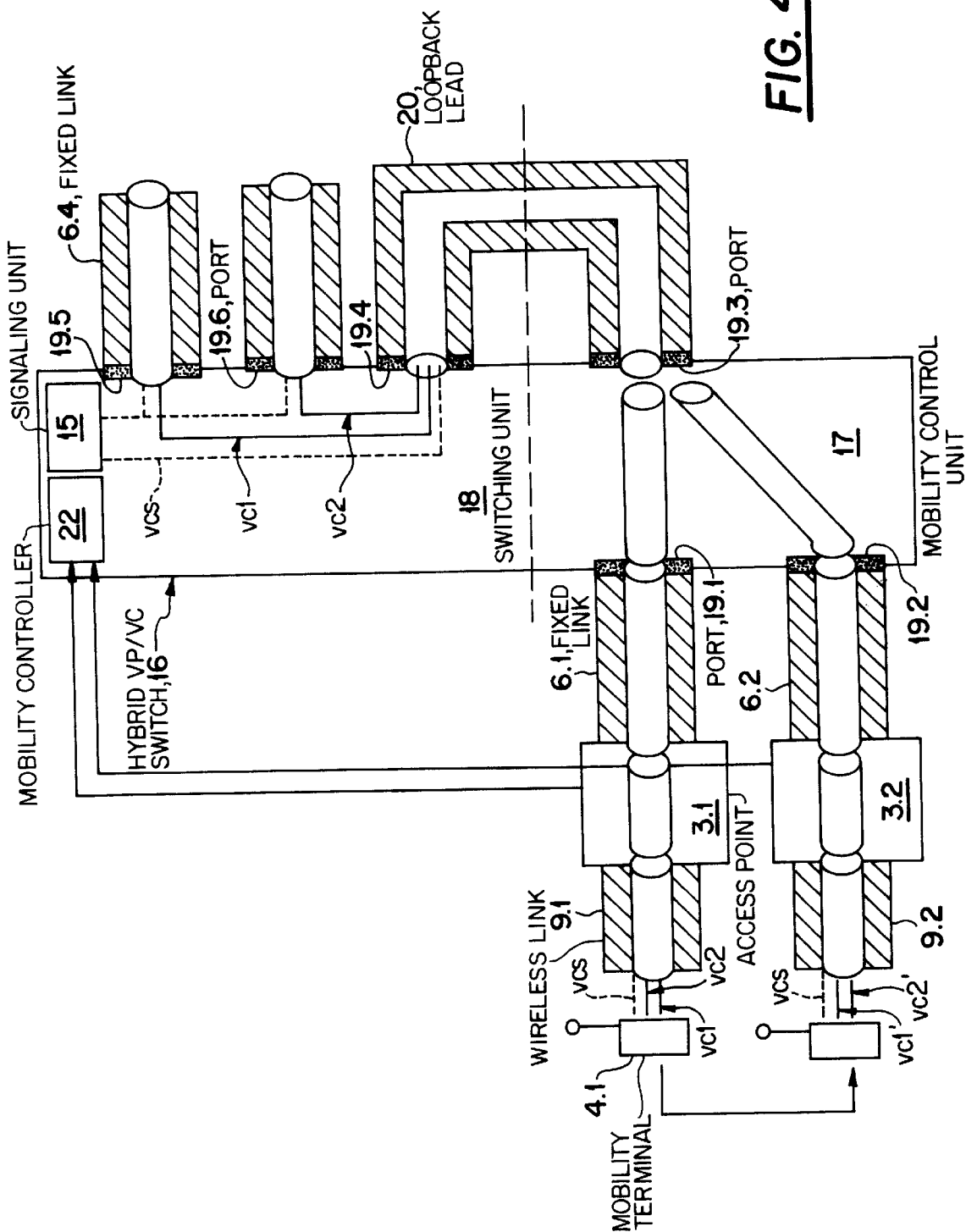
FIG. 4 a diagrammatic representation of a second embodiment using one single hardware component with separate circuits for mobility control and for switching operations.

FIG. 4 illustrates an alternative embodiment with a hybrid VP/VC switch with loopback.

A hybrid VP/VC switch is a hardware component 16 which is capable to execute VP- and VC-switching. This means that the component can switch either a particular VC or a particular VP. (VP switching results in a simultaneous switching action for all VCs in the particular VP.)

The hybrid VP/VC switch 16 is functionally divided into two separate units 17 and 18. Mobility control unit 17 has as many ports 19.1, 19.2 as there are access points to be served. One port 19.3 is directly connected (e.g. via loopback lead 20) with an input/output port 19.4 of switching unit 18. The ports 19.5, 19.6 of unit 18 are connected to the fixed links 6.4, 6.5. (There may be several loopback links instead of just one.)

In this configuration, the VP that is associated with the mobile terminal runs from the mobile terminal through the access point to the hybrid VP/VC switch 16. In unit 17 the VP is conducted from port 19.1 associated with the access point to port 19.3 associated with the loopback. No VCs of the VP branches off at this stage. At the other end of the loopback lead 20, the VP is terminated and the individual VCs are switched to the appropriate target ports.

The registration/de-registration procedures are the same as in the case of two separate units (FIG. 3). Call processing is handled the same way as it is handled in the arrangement that uses two different units or components. FIG. 4 also illustrates what happens when handover occurs. The mobile terminal 4.1 moves from the radio cell 5.1 that is served by access point 3.1 to the radio cell 5.2 that is served by access point 3.2. In the unit 17, the VP cross-connection between ports 19.1 and 19.3 is shifted in order to connect ports 19.3 and 19.2.

The shifting of a VP cross-connection in the unit 17 can be done in different ways. One way is for example to release the existing VP cross-connection and immediately establish a new VP cross-connection. This requires no special hardware support unit 17, but is not a seamless operation. Another way is to use a specifically designed switch which supports handover operations which allows an existing cross-connection to be shifted in one atomic operation. A third possibility is to establish the new cross-connection first and then to release the cross-connection to the old access point. This requires the switch to be capable of handling point-to-multipoint VP-connections.

The loopback connection may be (as described) an external connection or (in an alternative embodiment) an internal wiring (for example on the backside of the hardware component or inside the housing of the component).

Figure 5:
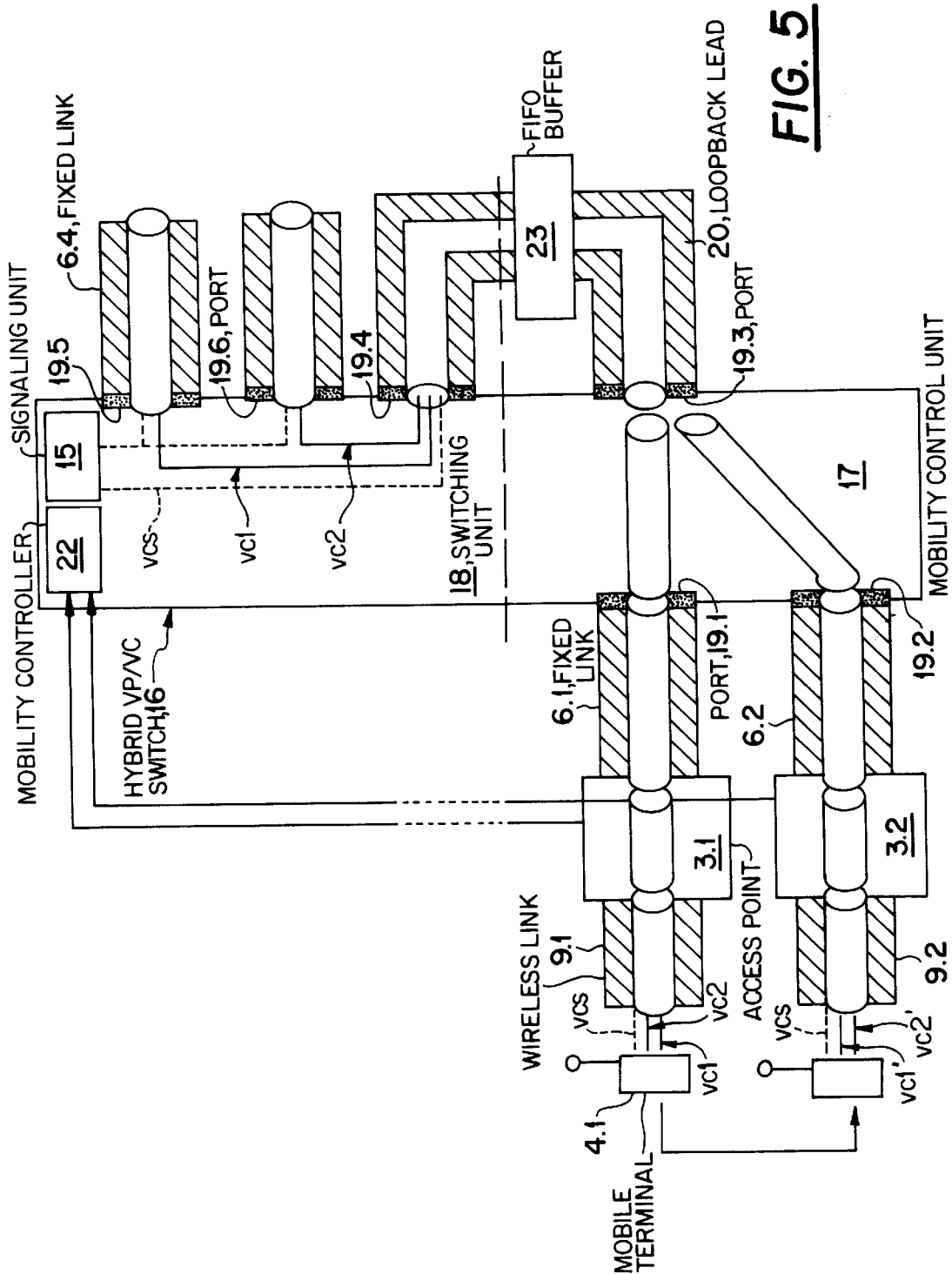
FIG. 5 a diagrammatic representation of an embodiment with a handover buffer in the loopback link.

Both embodiments can preferably be adapted to perform a lossless handover. No losses means that no ATM-cells are lost during the handover procedure. As shown in FIG. 5, the improvement may consist in a FIFO buffer 23 that is included in the loopback 20 between the two functional units 17 and 18. (In the embodiment of FIG. 3 the buffer can be inserted in the fixed link 14 between the units 10 and 11.) The FIFO buffer 23 provides temporary buffering of ATM-cells.

As soon as a handover is started and the radio link to the mobile terminal is lost, the buffer in the loopback is activated and begins to store ATM cells that have to be transmitted to the mobile terminal. The pending VP cross-connection (between ports 19.1 and 19.3) is removed. Any ATM cells that are currently buffered in access point 3.1 for transmission may be returned to port 19.1 and from there via a temporary VP cross-connection to the port 19.2 of the new access point 3.2. When all ATM cells from access point 3.1 have reached access point 3.2 the temporary VP cross-connection is removed and a new VP cross-connection between port 19.3 and port 19.2 is established. Subsequently, the ATM cells that are stored in the FIFO the loopback buffer 23 are forwarded to the mobile terminal. As the radio link is established, the mobile terminal also begins to transmit ATM cells to access point 3.2. A temporary load peak in both directions is required to transmit the backlog of ATM cells accumulated during the handover period.

Instead of forwarding the ATM cells that have been buffered in the access point 3.1 via a temporary VP cross-connection between ports 19.1 and 19.2, they may be sent back to the FIFO loopback buffer first, in order to be transmitted afterwards via the new VP cross-connection through port 19.3 and port 19.2 and from there to the new access point 3.2.

The FIFO loopback buffer that is inserted in the link between the mobility control unit and the VP/VC connection related switching unit may have a predetermined length (e.g. 100 cells) and may store copies of all passing ATM cells. The oldest ATM cell in the buffer is always discarded when a new ATM cell has to be copied into the buffer. This has the advantage that the ATM cells that are buffered in the access point do not have to be sent back to the mobility control unit when a seamless handover has to be performed. Instead, copies of the relevant ATM cells that are buffered in the first access point may be sent directly from the FIFO buffer in the link between the two units 10, 11 or 17, 18. This procedure does not require to divert ATM cells from the old access point via a temporary VP to the new access point.

The system architecture as described has the following two main features:

The switching functions to support mobility are clearly separated from the switching functions that provide user end-to-end connections and Quality of Service (QoS).

Mobility is managed at VP level, user connections and QoS at the VC level.

The handover is therefore performed at VP level and not at VC level. This has the following advantages:

Mobility can be realized with standard switch hardware that allows separate VP/VC switching.

All user VC connections are moved simultaneously.

Handover does not disturb any QoS buffers used by the VC connections.

Handover only requires a CAC calculation for the VP and not for individual VCs which results in fast operation.

The mobility control unit can be used as a front end extension to existing switches that are already installed in fixed network environment.

The switching architecture may be implemented by integrated circuits. The switching architecture may be established by several integrated components on one board. It may also be implemented by a plurality of geographically distributed entities (e.g. a closed ring of interconnected units) The hardware is dedicated to the functions of the units. A conventional ATM switch hardware may be enhanced by a functional front-end module for the mobility control according to the invention.

The invention may be realized by means of a conventional VP-switch (for mobility control) and a subsequent VC-switch (for user VC switching). An additional buffer module may be inserted in the fixed link between the two switching modules.

What is claimed is:

1. An ATM switching architecture for a wireless telecommunications network, comprising:

a plurality of ports for a plurality of access points of a wireless communication system;

means for performing switching operations and mobility control including a first unit for performing a mobility related switching and a second unit for performing a VP/VC connection related switching, wherein said first unit switches a virtual path containing all virtual channels of a mobile terminal from a first port of said first unit associated with a first access point, to a second port of said first unit connected to a first port of said second unit, and wherein said second unit distributes said all virtual channels of said mobile terminal from said first port of said second unit to different destination ports in said second unit.

2. The ATM switching architecture according to claim 1, wherein the first unit and the second unit are implemented in separate dedicated hardware components.

3. The ATM switching architecture according to claim 1, wherein the first unit and the second unit are implemented in functionally separate units of a single hardware component and are connected by a loopback link.

4. The ATM switching architecture according to claim 1, wherein the second unit contains a signaling unit connected to the mobile terminal by a virtual channel for controlling a user communication.

5. The ATM switching architecture according to claim 1, wherein a handover buffer is inserted in a link between said first and said second units.

6. The ATM switching architecture according to claim 2, wherein the second unit contains a signaling unit connected to the mobile terminal by a virtual channel for controlling a user communication.

7. The ATM switching architecture according to claim 3, wherein the second unit contains a signaling unit connected to the mobile terminal by a virtual channel for controlling a user communication.

8. The ATM switching architecture according to claim 2, wherein a handover buffer is inserted in a link between said first and said second units.

9. The ATM switching architecture according to claim 3, wherein a handover buffer is inserted in the loopback link (14; 20) between said first and said second units.

10. The ATM switching architecture according to claim 4, wherein a handover buffer is inserted in a link between said first and said second units.

11. The ATM switching architecture according to claim 5, wherein, said handover buffer is a FIFO buffer.

12. A method for switching ATM signals in a wireless telecommunications network, comprising:

providing a plurality of ports for a plurality of access points of a communications system;

performing mobility related switching of a virtual path containing all virtual channels of a mobile terminal from a first port of a first switching unit associated with a first access point to a second port of the first switching unit;

providing said all virtual channels from the second port of the first switching unit to a first port of a second switching unit;

distributing each of said all virtual channels from the first port of the second switching unit to an appropriate one of a plurality of destination ports in the second unit.

* * * * *